Feb. 9, 1971  C. G. BOWMAN ET AL  3,561,123
HAND LEVEL
Filed March 24, 1969

INVENTOR.
CLIFFORD G. BOWMAN
DON C. BOWMAN
BY
ATTORNEY

United States Patent Office 3,561,123
Patented Feb. 9, 1971

3,561,123
HAND LEVEL
Clifford G. Bowman, 3527 Talbott St., San Diego, Calif., 92106, and Don C. Bowman, Box 41, Round Mountain, Nev. 89045
Filed Mar. 24, 1969, Ser. No. 809,797
Int. Cl. G01c 5/00, 9/32
U.S. Cl. 33—73                10 Claims

ABSTRACT OF THE DISCLOSURE

A hand level formed principally of an elongated, substantially transparent element, the front of which carries a peephole and the rear a peep sight. The element provides a generally flat, vertically disposed, horizontally elongated reservoir which extends substantially parallel and at one side of a straight line between the peephole and peep sight. The reservoir contains a colored liquid. A light reflecting surface is positioned to reflect light from the liquid through the peephole.

BACKGROUND OF THE INVENTION (1) Field of the invention

Hand level for determining horizontal parallel.

(2) Description of the prior art

The hand levels of the prior art included bubble type levels which were removably set in the sight tube. These bubble type levels required delicate adjustments, which adjustments could not be retained when the sight tube was subjected to jars normally encountered.

SUMMARY OF THE INVENTION

The present invention comprises an elongated and substantially transparent element formed of, for example, a polymerized methyl methacrylate, such as Lucite. It carries a peephole at the front and a peep sight at the back. The element provides a vertically disposed, horizontally elongated and closed reservoir. This reservoir extends substantially parallel with and horizontally at one side of a straight line between the peephole and the peep sight. The reservoir contains a colored liquid, the quantity of which is such that the top level thereof is at the same height as the straight line when the line is on a horizontal plane. The level also includes a reflecting surface which is disposed to reflect light from the liquid through the peephole.

Other features and the advantages of the present invention will be apparent from the following description, reference being made to the accompanying drawing wherein a preferred embodiment of the invention is illustrated.

DESCRIPTION OF THE PREFERRED EMBODIMENT

Figure 1:
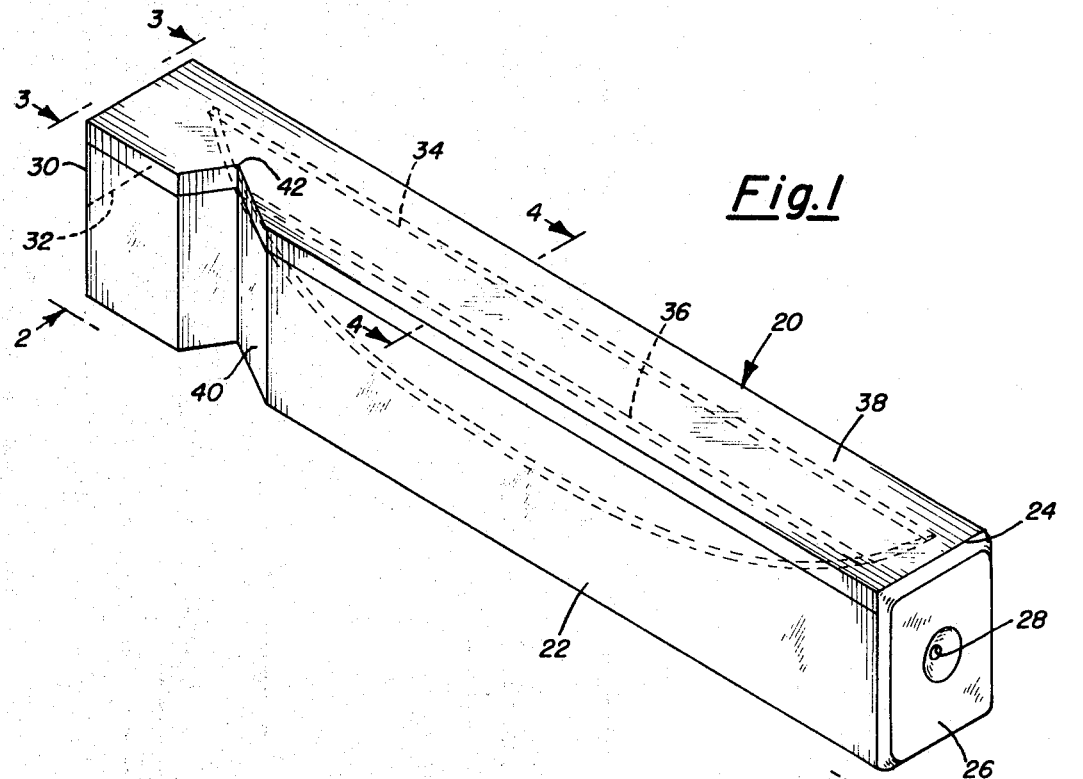
FIG. 1 is a perspective view of the level, the resevoir and liquid being shown by dotted lines.
Figure 2:
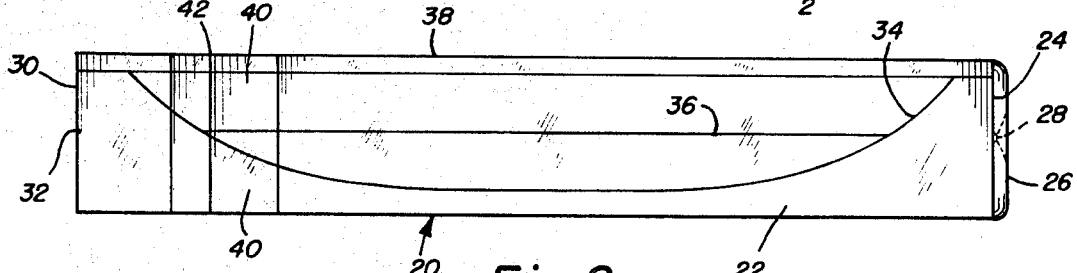
FIG. 2 is a side view looking in the direction of arrows 2—2 of FIG. 1, showing in full lines the outline of the reservoir and the top level of the liquid in the reservoir.

Referring more in detail to the drawing, the level 20 includes the elongated and substantially transparent element 22 which may be formed of a plastic such as that described in the summary. The front 24 is provided with a means for providing a peephole, such means being herein shown as a suitable covering of opaque material which is applied in any suitable manner, such as by a paint. The covering is herein shown as an opaque plastic member 26 which is suitably affixed to the smooth front surface 24 of the element 22. Such affixing may be by an epoxy. The covering is provided with a hole 28 therethrough herein referred to as a peephole.

The back 30 of element 22 is provided with a sight herein disclosed as a horizontal line 32. This line is visible through the peephole 28 when an eye is placed adjacent the hole.

The element 22 is provided with a vertically disposed and horizontally elongated reservoir 34. It is disposed lengthwise and substantially parallel and preferably parallel at one side of a straight line which intersects the peephole 28 and the peep sight 32, as is more clearly shown in FIGS. 3 and 5. This reservoir contains a quantity of anti-freeze liquid 36 which is colored and has the flow characteristic of water. The quantity of the liquid 36 is such that when the aforesaid straight line is in the horizontal plane and the reservoir is in the vertical plane, the top level is at the same horizontal plane as the straight line. The reservoir 34 is closed by a cover 38 which is sealed to the top of the element 22.

The element 22 is provided also with a reflecting surface that is so positioned that it reflects light from the liquid 36 to the eye of an observer when the eye is peering through the peephole 28. The reflector, although not necessarily so, is herein shown as formed integrally with the element 22 and comprises an angling surface 40 which extends rearwardly and inwardly. It can be placed at any position along the element provided it reflects light properly from the liquid through the peephole 28. It is disposed preferably, as herein shown, near the rear of the element 22 and reservoir 34 and on that side of the aforesaid straight line which is opposite the reservoir. In the position shown, the angular relationship of surface 40 to the confronting liquid in the reservoir is approximately thirty-two degrees.

Figure 3:
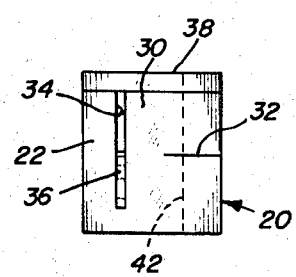
FIG. 3 is an end view looking in the direction of arrows 3—3 of FIG. 1, but showing the reservoir and liquid level by dotted lines.
Figure 4:
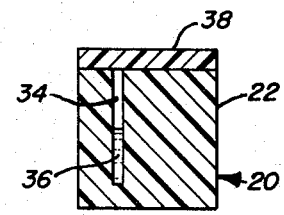
FIG. 4 is a sectional view taken along line 4—4 of FIG. 1.
Figure 5:
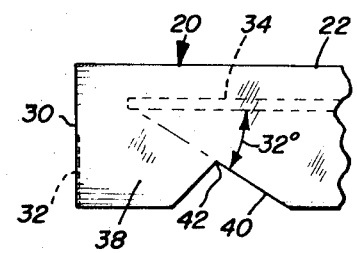
FIG. 5 is a fragmentary top plan view of the rear portion of the level.

The liquid 36 and the outline of the reservoir can be seen when viewing the level while the level is in the positions shown in FIGS. 1, 3 and 5, but they are merely shown in dotted lines in those figures since full lines may add confusion to the drawing. Likewise, for the same reason, the inner end 42 of the angling surface 40 is shown in dotted lines in FIG. 3.

By sighting through the peephole 28 at two objects which are aligned with the peep sight 32, the observer will determine by the angle of the top surface of the liquid 36 whether the farther object is above or below the closer object. If those objects are in the same horizontal plane, the top surface of the liquid will be parallel with the line intersecting the peephole 28 and peep sight 32. Specifically, if the farther object is at a lower level than the closer object, then in that event, the liquid level will be higher than the straight line at the rear of the level, and vice versa.

From the foregoing it is readily apparent that by virtue of the present invention a level has been provided which is inexpensive to manufacture, readily manipulated, practically indestructible and when once sealed, it will never require further adjustment although subjected to jars.

Having described our invention, we claim:

1. A level comprising:
   (A) an elongated, substantially transparent element;
   (B) means on an end face of the element forming a peephole; said element having:
      (1) a peep sight on an opposite end face which is visible through the peephole, (2) a generally flat, vertically disposed, horizontally elongated, closed reservoir extending within the element substantially parallel with and at one side of a straight line which intersects the peephole and the peep sight, said reservoir containing a liquid, the quantity of which is such that the top level thereof is at the same height as the said straight line when said line is on a horizontal plane, (3) a reflecting surface of the element positioned to reflect a side view of the top level of the liquid through the peephole.

2. A level as defined in claim 1, characterized in that the reflecting surface comprises a vertically extending surface angling rearwardly and inwardly.

3. A level as defined in claim 1, characterized in that the reflecting surface is disposed adjacent the rear of the element.

4. A level as defined in claim 1, characterized in that the reflecting surface is formed integrally with the element and comprises a vertically extending surface angling rearwardly and inwardly.

5. A level as defined in claim 1, characterized in that the means forming the peephole includes:

(a) a covering on the front of the element, said covering having an opening therethrough.

6. A level as defined in claim 2, characterized in that the angling surface is formed integrally with the element.

7. A level as defined in claim 3, characterized in that the angling surface is formed integrally with the element.

8. A level as defined in claim 5, characterized in that the reflecting surface comprises a vertically extending surface angling rearwardly and inwardly.

9. A level as defined in claim 5, characterized in that the reflecting surface is disposed adjacent the rear of the element.

10. A level as defined in claim 5, characterized in that the reflecting surface is formed integrally with the element and comprises a vertically extending surface angling rearwardly and inwardly.

References Cited

UNITED STATES PATENTS

| 518,678 | 4/1894 | Paoli. |
| 2,335,893 | 12/1943 | Altenberg. |
| 3,435,533 | 4/1969 | Whitfield. |

FOREIGN PATENTS

| 111,171 | 8/1940 | Australia. |
| 332,391 | 8/1903 | France. |
| 1,076,700 | 4/1954 | France. |
| 1,037,566 | 7/1966 | Great Britain. |
| 428,667 | 12/1947 | Italy. |
| 239,981 | 3/1946 | Switzerland. |

ROBERT B. HULL, Primary Examiner

U.S. Cl. X.R.

33—206; 356—249